Feb. 7, 1928.

A. FINN 1,658,764

AUTOMOBILE BUMPER

Filed Feb. 23, 1927

Abraham Finn
INVENTOR

BY Victor J. Evans
ATTORNEY

Feb. 7, 1928.
A. FINN
1,658,764
AUTOMOBILE BUMPER
Filed Feb. 23, 1927
2 Sheets-Sheet 2
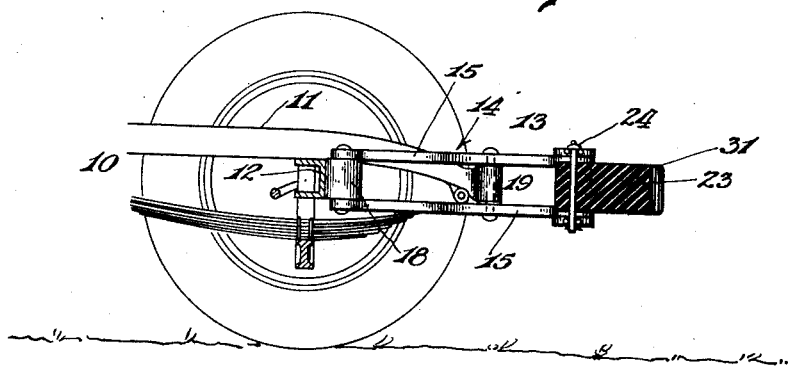
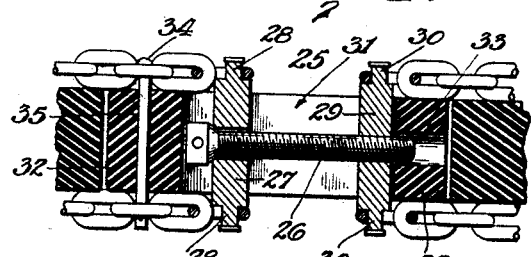
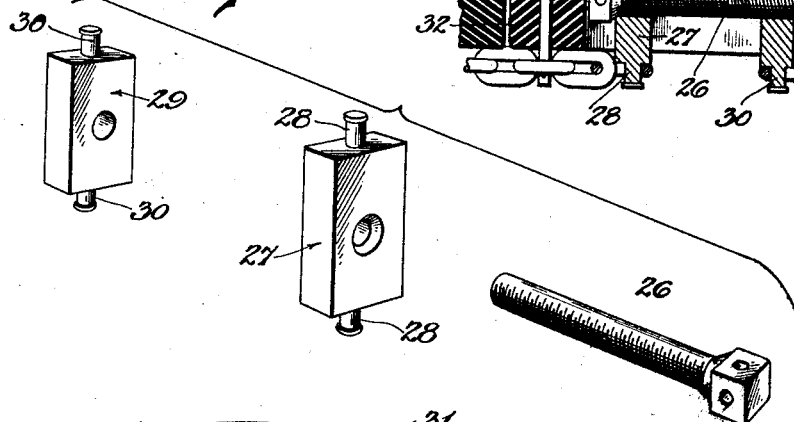
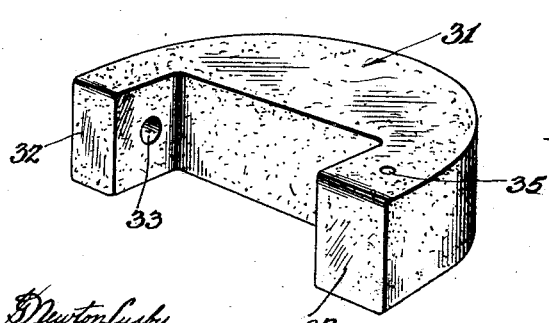
Abraham Finn
INVENTOR Patented Feb. 7, 1928.

1,658,764

UNITED STATES PATENT OFFICE.

ABRAHAM FINN, OF ELIZABETH, NEW JERSEY.

AUTOMOBILE BUMPER.

Application filed February 23, 1927. Serial No. 170,364.

This invention relates to improvements in automobile bumpers.

The primary object of the invention resides in a yieldable bumper for motor vehicles for absorbing any shock should the vehicle collide with another or any object and for protecting the vehicle from damage usually caused by a collision.

Another object of the invention is to provide a bumper which includes a chain or flexible element adapted to bridge the front of an automobile and which supports cushion members of gradually increasing sizes from the ends of the chain toward the center thereof so as to provide an arcuate shape bumper surface.

A further object is to provide in a bumper of the above construction, a novel means of taking up any slack in the chain or flexible element to maintain the same in a taut condition.

A still further object is the provision of an automobile bumper which is simple in construction, attractive in appearance so as not to detract from the beauty of an automobile to which it might be attached and which is strong and durable for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a vertical sectional view on the line 3—3 of Figure 1.

Figure 4 is an enlarged detail vertical sectional view on the line 4—4 of Figure 1.

Figure 5 is a perspective view of the adjusting device.

Figure 6 is a similar view of the locking member for the adjusting device.

Figure 1:
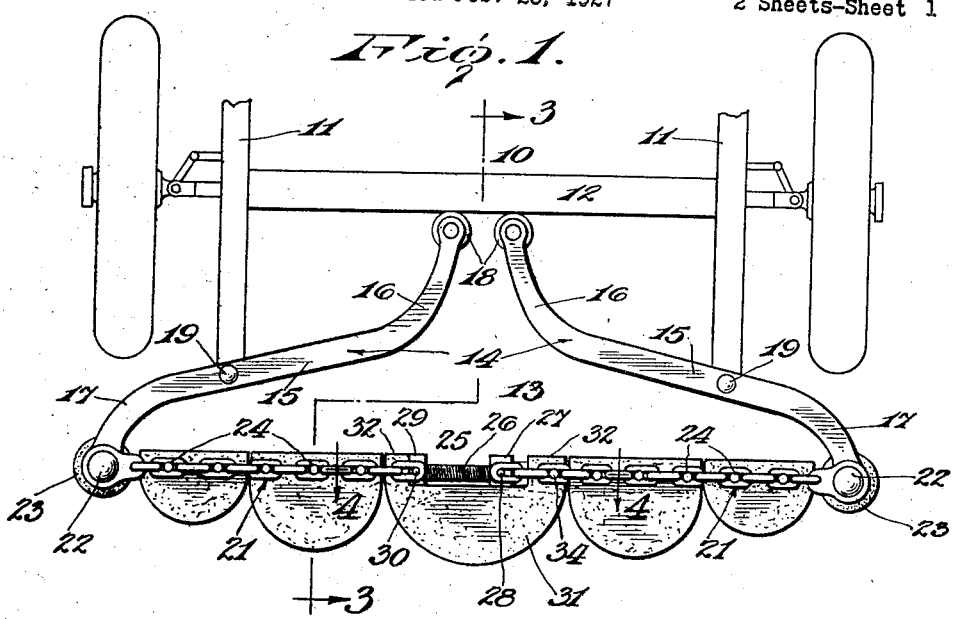
Figure 1 is a top plan view of my improved bumper in position upon the chassis frame of an automobile.
Figure 2:
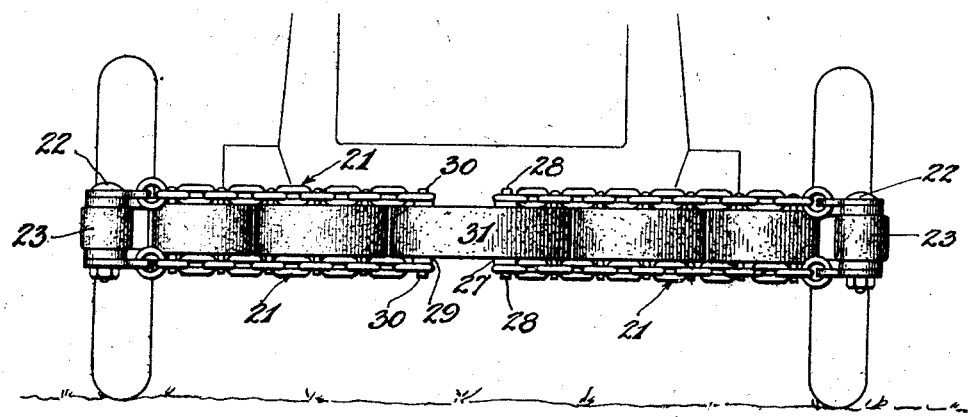
Figure 2 is a front elevation.

Referring more particularly to the drawing, the reference numeral 10 designates the chassis frame of a motor vehicle which includes spaced longitudinal channel bars 11 which are braced by a transverse cross bar or rail 12. My improved bumper is shown in its entirety as at 13 and may be mounted both on the front and rear of a motor vehicle, is desired.

The bumper 13 includes a pair of identical arms 14, each of which comprises a pair of spaced parallel plates 15 having inwardly curved portions 16 and oppositely curved portions 17. The inner ends of the plates of each arm support a roller or bearing surface 18 which bears against the outer side of the cross bar 12 for limiting movement of the same in one direction. The arms 14 are mounted to the outer end of the channel bars 11 as at 19, for a purpose to be presently explained.

Bridging the space between the arms 14 are spaced flexible elements or chains 21 which have their outer ends fixed to the arms 17 by bolts 22 which pass through the arms and through the end rubber cushion members 23. The intermediate rubber cushion members 23 gradually increase in size toward the center and are also attached to the spaced chains by bolts or rivets 24. By gradually increasing the size of the cushion members, the bumper surface appears arcuate in plan. The cushion members are semi-circular in plan, with the flat sides disposed parallel to the chains.

The meeting ends of the chains 21 are joined by an adjusting device 25 which comprises a headed bolt 26 having a collar 27 mounted thereon and which collar is provided with opposed pins 28 for receiving the end links of the chains 21, which chains are disposed on one side of the center of the bumper. The head of the bolt is square and serves as an abutment for the collar 27. The shank of the bolt is threaded to receive a nut 29 having outwardly extending lugs or pins 30 for the connection of the free ends of the other chains 21. It will be seen that by turning the bolt in one direction, the nut will be fed toward the collar to bring the chains in a taut or substantially taut condition. The bolt is prevented from accidental retrograde movement by a locking member 31 which has ears 32, one of said ears being provided with a horizontally disposed opening 33 for the reception of the free end of the shank or bolt 26. The head of the bolt abuts the inside of the member and cannot turn as the said member is held in a fixed position with respect to the bolt by a pin or bolt 34 which passes through the links of the chain and through a vertical opening 35 in said member. By the adjustment of the bolt, the bumper surface may always be kept in a taut condition.

In operation, should the bumper come in contact with an obstacle disposed in the path of the vehicle to which it is attached, the chains being flexible will flex inwardly, and will exert a pull on the outer ends of the arms 14 but the arms cannot move as the inner ends abut the cross bar 12. Should the outer ends of the arms 15 strike an obstacle, the shock will be taken up by the end members 23. However, should the force of the shock be so great as to cause damage, then the pin 19 will break but the major portion of the shock will have to be relieved by the bumper composed of the flexible elements and the cushion members.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An automobile bumper comprising a pair of arms adapted to be mounted forward of an automobile, and a flexible bumper element connected to said arms and bridging the space between the outer ends thereof, said bumper element including spaced chains, and yieldable cushion members interposed between said chains.

2. An automobile bumper comprising a pair of arms adapted to be mounted on the front of an automobile, spaced chain sections connected to the outer ends of said arms, cushion members interposed between said spaced chain sections, and an adjusting device connecting the meeting ends of the chain sections.

3. An automobile bumper comprising a pair of arms adapted to be mounted on the front of an automobile, spaced chain sections connected to the outer ends of said arms, cushion members of gradually increasing sizes from the outer ends of said chain sections toward the inner ends thereof, said cushion members interposed between said spaced chain sections, and an adjusting device connecting the meeting ends of the chain sections.

4. A bumper construction comprising a pair of spaced chain sections adapted to be rigidly connected to a supporting structure at the outer ends thereof, and cushion members supported by said chain sections and interposed therebetween.

5. A bumper construction comprising a pair of spaced chain sections adapted to be rigidly connected to a supporting structure at the outer ends thereof, cushion members supported by said chain sections and interposed therebetween, and means within said chain sections intermediate their ends for adjusting the slack therein.

In testimony whereof I have affixed my signature.

ABRAHAM FINN.